(12) United States Patent
Phelps

(10) Patent No.: US 7,849,322 B2
(45) Date of Patent: Dec. 7, 2010

(54) METHOD FOR EXCHANGING A 3D VIEW BETWEEN A FIRST AND A SECOND USER

(75) Inventor: Nicholas Phelps, Paris (FR)

(73) Assignee: E-On Software, Paris (FR)

( * ) Notice: Subject to any disclaimer, the term of this patent is extended or adjusted under 35 U.S.C. 154(b) by 1173 days.

(21) Appl. No.: 11/490,938

(22) Filed: Jul. 21, 2006

(65) Prior Publication Data

US 2008/0022408 A1  Jan. 24, 2008

(51) Int. Cl.
*G06F 21/00* (2006.01)
*G06F 17/50* (2006.01)
*G06F 17/10* (2006.01)
*G06G 7/48* (2006.01)

(52) U.S. Cl. ................... 713/182; 703/2; 703/6
(58) Field of Classification Search ............ 703/7; 713/182
See application file for complete search history.

(56) References Cited

U.S. PATENT DOCUMENTS

| | | | |
|---|---|---|---|
| 7,170,525 B2 * | 1/2007 | Fenney et al. | 345/582 |
| 2003/0067474 A1 * | 4/2003 | Fenney et al. | 345/582 |
| 2004/0002841 A1 * | 1/2004 | Mayuzumi et al. | 703/7 |
| 2004/0221167 A1 * | 11/2004 | Fenney et al. | 713/189 |
| 2005/0012756 A1 * | 1/2005 | Fenney et al. | 345/582 |
| 2005/0055550 A1 * | 3/2005 | Fenney et al. | 713/167 |
| 2007/0103481 A1 * | 5/2007 | Fenney et al. | 345/582 |

* cited by examiner

*Primary Examiner*—Christian LaForgia
(74) *Attorney, Agent, or Firm*—IM IP Law PLLC; C. Andrew Im

(57) ABSTRACT

The invention relates to a method for exchanging a 3D view between a first and a second user having both a piece of software for creating 3D views. A view is created by the first user. This view comprises an encrypted object, the first user being licensed for the encrypted object. This view is stored in a file by the first user. The encrypted object is encrypted and the result of this encryption is stored as encrypted data in the file. According to the invention, non-encrypted data defining the encrypted object is stored in the file in parallel to the encrypted data relating to the encrypted object. This non-encrypted data can be read by the second user, so that the second user can see the encrypted object if he has acquired a license for this object, or a basic representation of the encrypted object if he has not acquired a license.

10 Claims, 1 Drawing Sheet

METHOD FOR EXCHANGING A 3D VIEW BETWEEN A FIRST AND A SECOND USER

FIELD OF THE INVENTION

The invention relates to a method for exchanging a 3D view created by a piece of software for creating 3D views. One of the aims of the invention is to allow a user to read a view created by another user that comprises an encrypted object. The piece of software is used to create outdoor or indoor views. The piece of software can be used in the field of architecture, illustration, or the creation of virtual images for movies or video games.

BACKGROUND OF THE INVENTION

The piece of software uses a license number which is provided to the user when he acquires a copy of the software, each license number being different from one copy of the software to another. Some objects such as trees, stones or basic buildings are provided to the user so that he can create 3D views. These objects are referred to as public objects. These public objects are provided with each copy of the software. Thus the views comprising public objects can be exchanged between different users of the software, i.e., a view created by a first user can be read by a second user.

Furthermore, encrypted objects such as a particular type of car or a particular type of building can be acquired separately by the user. These encrypted objects can only be read with the software license for which they have been encrypted. Each encrypted object is encrypted and can be deciphered by a key specific to the user's software license. This way if a first user creates a 3D view comprising an encrypted object for which he has acquired a license, a second user cannot read this view. As a matter of fact, the second user does not have the key to decipher the encrypted object of the first user, even if he is licensed for the same object. The reason is that, in order to avoid the users exchanging encrypted objects without acquiring a license for these objects, the keys used to decipher a given encrypted object are different from one software license to another.

A possible solution for exchanging views comprising encrypted objects would be to get the key of the second user, so that the first user can encrypt the view with this key. Then the second user would be able to read the view that has been encrypted with his key.

But this solution is not very safe because data that the users are not supposed to access (i.e. the keys of the encrypted objects) would be exchanged between the users. Furthermore, the encrypted view can be read only by a particular user (the one for which the view has been encrypted), but not by all the users having a license for the encrypted objects of the view. Moreover it is not possible to be sure that the second user sending the key to the first user has a license for the encrypted object of the view.

One of the aims of the invention is to allow the exchange of a view comprising an encrypted object, while minimizing the risk of use of objects by unauthorized users.

SUMMARY OF THE INVENTION

To achieve this aim, non-encrypted data defining the encrypted object is added in parallel with the encrypted data of the object sent to the second user, so that the second user can see a part or the whole object whether he is licensed or not for the encrypted object.

According to the invention, an object can be an element of the 3D view such as a stone, a tree, a building, a lake or an animal. However, an object can also be an image, a method for positioning elements in the view, a method for modifying the position of the elements in the view, a filter for modifying the aspect of an element of the view, a method for modifying the lighting of the view, a method for limiting the size of a stored view . . .

In fact an object according to the invention can be any extension content that the user can acquire separately from the software, this extension content having a technical and/or an esthetical feature.

In case the second user does not have a license for the encrypted object used in the view created by the first user, the second user can see and modify the public objects (to which he has access) but he cannot see the encrypted object for which he is not licensed.

In this case, the encrypted object is replaced by a dummy object which indicates where the encrypted object is located in the view. To achieve this, non-encrypted data defining the basic shape of the encrypted object is stored when the view is saved. This non-encrypted data can be the size, the location in the 3D view, the name of the encrypted object, and optionally the material of this object, or a basic representation of the object. In other words, the dummy object is defined by the minimum parameters needed by the user to identify an object in a 3D view.

If the second user (the one who is not licensed for the encrypted object) modifies the view created by the first user and saves the view, the first user (the one who is licensed for the encrypted object) will be able to see the whole 3D view, i.e. the modifications made by the first user but also the encrypted object for which he is licensed.

In case both users have a license for the encrypted object, they can exchange the view as if they had the same license for the object. To achieve this, the encrypted object is encrypted with a generic key and not with the key specific to the user. This generic key is unique for a given object, but different for each object.

In order to avoid the generic key to be known by the users, this generic key is encrypted with the specific key of the users associated to the encrypted object. Thus in order to have access to the generic key associated to an encrypted object, a given user must first have access to a first key which is associated to the encrypted object for which he has acquired a license. Then this first key is used to decipher the generic key.

In order to identify the generic key which has been used to encrypt the object, non-encrypted data is added to the encrypted object. This non-encrypted data identifies an encrypted object in a unique way. Thus when the user reads the non-encrypted data, he can know whether he has or not the license (i.e. the key) permitting the access to the generic key. The non-encrypted data identifying the object can be a name of the object, a name of a file, or any other unique identifier produced by a method for identifying an object.

In a particular embodiment, in order to locate quickly the encrypted object, the location of the encrypted object in the memory of the user's computer is stored in a table. This table associates the encrypted object with its location in the memory of the user's computer. This table is updated each time the user acquires or uses a new encrypted object.

Thus the invention relates to a method for exchanging a 3D view between a first and a second user having both a copy of a software product for creating 3D views, the copies of the software having different license numbers, in which:

a view is created by the first user, this view comprising an encrypted object, the first user being licensed for the encrypted object, this view is stored in a file by the first user, the encrypted object being encrypted, the result of this encryption being stored as encrypted data in the file, wherein non-encrypted data defining the encrypted object is stored in the file in parallel with the encrypted data relating to the encrypted object, this non-encrypted data can be read by the second user, so that the second user can see the encrypted object if he has acquired a license for this object, or a basic representation of the encrypted object if he has not acquired a license for this object.

BRIEF DESCRIPTION OF THE DRAWINGS

The invention may be best understood by reference to the following description taken in conjunction with the accompanying drawings, where like numerals represent like components, in which.

DETAILED DESCRIPTION OF EMBODIMENTS OF THE PRESENT INVENTION

Figure 1:
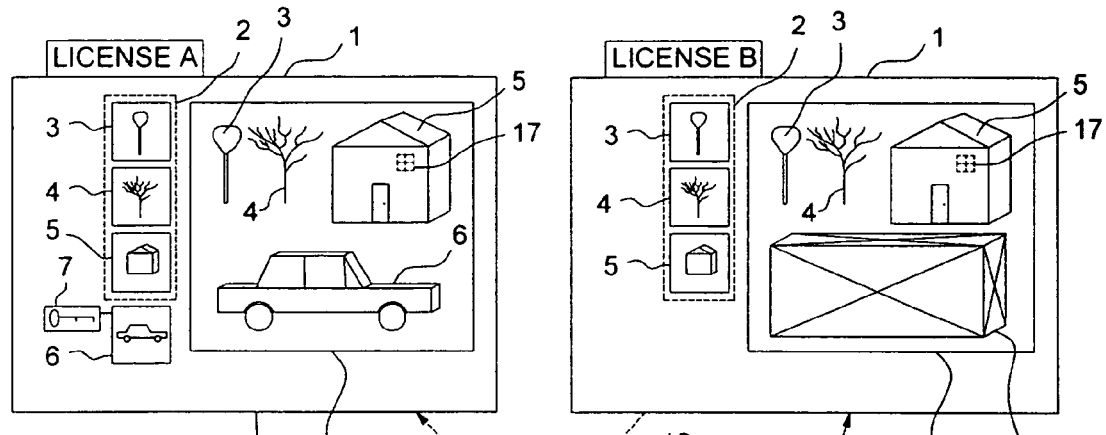
FIG. 1 is a schematic of the exchange of a 3D view between a first user having the license for an encrypted object used in the view and a second user not having the license for the encrypted object.

A first user and a second user have acquired a copy of a software 1 for creating 3D views. A license A has been provided to the first user and a license B has been provided to the second user. Licenses A and B of the first and second users are different.

A library 2 comprising different types of public objects, such as a first species of tree 3, a second species of tree 4, and a house 5, has been provided with each copy of the software 1. The first and the second user can use the public objects 3-5 of the library 2 to create 3D views.

Moreover, the first user has acquired an encrypted object 6 (a car), a key 7 to encrypt and decipher this object 6 being provided with this object 6. The second user has not acquired the encrypted object 6.

The first user creates a 3D view 8 comprising the objects 3-5 and the car 6. The first user can modify the objects 3-5 of the view 8 with regard to the original ones. In order to share the view 8 with the second user, the first user saves 9 this view 8 in a file 10.

This file 10 comprises public data 10.1 relating to the objects 3-5. The file comprises also data 10.2 relating to the basic parameters of the encrypted object 6, such as the size, the location, the name or the aspect of the encrypted object. These basic parameters define a dummy object 16 which has globally the same size and is located at the same place than the car 6 in the view 8. The data 10.1 and 10.2 are not encrypted. The data 10.1 and 10.2 are public data for the users having a software license.

The file 10 comprises also encrypted data 10.3 relating to the details of the object 6 such as the color, the material or the different volumes composing the object 6. This data 10.3 has been encrypted with the key 7 associated to the object 6 or with a generic key (see FIG. 2).

The file 10 is sent 15 to the second user who reads it. The second user can read the data 10.1 because it is not encrypted (the objects 3-5 are public). So the second user can see the objects 3-5 and the possible modifications made to these objects by the first user in the view 8.

However, the second user cannot read the encrypted data 10.3 because he does not have the key 7 to decipher this data. So the second user cannot see the details of the car 6 in the view 8.

But the second user can read the non-encrypted data 10.2 relating to the basic parameters of the car 6. So the second user can see the dummy object 16 in the view 8. This dummy object 16 replaces the car 6 and indicates that an encrypted object has been used to create the view 8.

If the second user modifies the view 8 by adding a window 17 to the house 5 and saves 18 the modified view, the first user will be able to see the whole 3D view, including the modifications made by the second user (the window 17) and the car 6 that he can decipher with his key 7. Moreover, the second user can modify certain properties of the dummy object 16 such as, for instance, its size or its location, so that the first user will be able to see the modifications of the dummy object made by the second user.

To achieve this, the modifications made by the second user are saved with the public data 10.1 or 10.2. The encrypted data that the second user could not read is saved in the file as encrypted data 10.3 by the second user, the software having not modified the encrypted data which could not be read.

Figure 2:
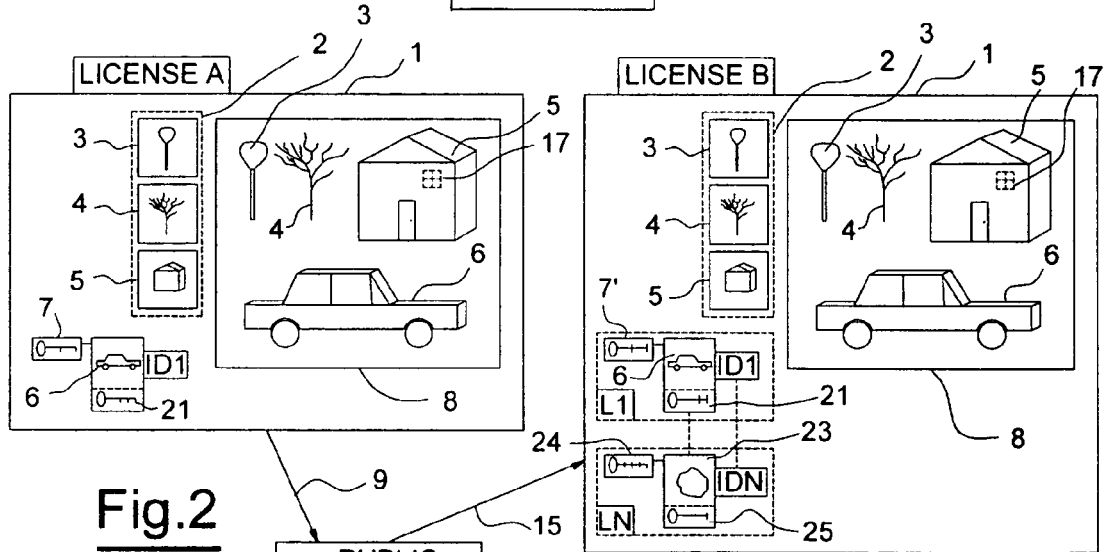
FIG. 2 is a schematic of the exchange of a 3D view between a first and a second users being both licensed for the encrypted object of the view.

FIG. 2 shows a different implementation that lets the second user see the object 6 if he has licensed object 6.

In order to avoid unauthorized exchange of this encrypted object 6 between users, the keys 7 and 7' provided with the object 6 are different from a user to another. To achieve this, the keys 7 and 7' can be specific to the encrypted object and are specific to the software license.

In order to allow the exchange of the view 8 between the two users, a generic key 21 is provided together with the data defining the encrypted object 6. This generic key 21 is encrypted with the specific key 7 or 7' of the user. This generic key 21 is unique for a given encrypted object but specific to each object.

This way, when the first user saves 9 the view 8 in the file 10, he can decipher the generic key 21 with his key 7 specific to the object 6. Then the first user can use the generic key 21 to encrypt the object 6 (that he has modified or not in the view). The data 10.3 resulting of this encryption is stored in the file 10.

Then, when the second user receives 15 the file 10, he can read data 10.4 that allows the unique identification of object 6. He can then locate object 6 in the memory of his computer, and use his key 7' specific to the object 6 in order to decipher the generic key 21. And then he can use this generic key 21 to decipher the encrypted data 10.3. The encrypted data 10.3 relates to the encrypted object 6 and to the possible modifications the first user has made to this object 6.

Moreover, as in FIG. 1, the objects 3-5 are stored as public data 10.1 in the file 10. This public data 10.1 is not encrypted. Thus when the second user reads the file 10, he can see all the 3D view created by the first user, including the car 6 (modified or not by the first user) for which he is licensed.

In the invention, the object encrypted in the file 10 can be identified among all the encrypted objects 6, 23 owned by the second user. To achieve this, the encrypted objects 6, 23 are identified by non-encrypted identifiers ID1-IDN. These identifiers ID1-IDN identify the encrypted objects in a unique way. The identifiers ID1-IDN can be the name of the encrypted object.

In a particular embodiment, the identifier ID1 corresponding to the car is stored in the file 10. Thus when the second user reads ID1, he can know whether or not he is licensed for the car 6. In other words, when the second user reads ID1, he can know whether or not he has the key 7' permitting the access to the generic key 21.

A system which is external and independent from the piece of software is able to give a unique identifier to each encrypted object. This independent system can be for instance a web site which first finds a new ID that has not been used yet with the existing encrypted objects, and then gives this new ID to a new encrypted object.

Furthermore, when the second user receives the ID of the encrypted object, he can browse his hard drive in order to locate the object corresponding to the ID and get the generic key associated to this ID.

Figure 3:
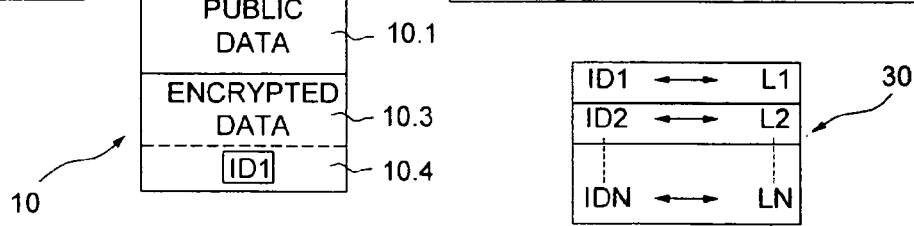
FIG. 3 is a schematic of a file establishing a link between an identifier of the encrypted object and the location of this object in the memory of the user's computer.

However, in a preferred embodiment, a table 30 represented at FIG. 3 is created for each user. Thanks to this table it is possible to locate quickly the encrypted object in the memory of the user's computer. To achieve this, the table 30 contains the identifiers ID1-IDN of the encrypted objects owned by the user and the location L1-LN of these encrypted objects in the memory of the user's computer.

In this table 30, the identifiers ID1-IDN are associated to the locations L1-LN of the encrypted objects in the memory of the user's computer. This way it is possible to know quickly that the encrypted car 6 and its generic key 21 associated to ID1 are located in location L1 of the user's hard drive, and a stone 23 and its generic key 25 (different from the generic key 21) associated to IDN are located in location LN of the user's hard drive.

Thus, when the second user receives ID1 that identifies the car 6, he can read table 30 and find location L1 of the car in the memory of his computer. Then he can locate the generic key 21 associated to the car 6.

The table 30 is updated each time the user acquires or uses a new encrypted object and stores it in the memory of his computer. The table may not be the same from one user to another, the user being free to choose the location of a new object in the memory of his computer.

In an alternative embodiment, after having read the identifier ID1 of the file 10, the second user does not decipher the encrypted data 10.3 with the generic key 21. Instead, the second user replaces the encrypted object 6 of the view by the encrypted object 6 located in the library of his software. In this embodiment, the encrypted data 10.3 may be excluded from the file 10. This embodiment may be useful if no modification has been made to the encrypted object 6 by the first user.

The piece of software according to the invention can be stored on a physical support which can be any support able to store data, for instance an optical disk (CD, DVD), or a USB device, or a card, or it can be sent to the end user via a communication network such as the Internet.

The invention claimed is:

1. Method for exchanging a 3D view between a first and a second user having both a copy of a software product for creating 3D views, the copies of the software having different license numbers, in which:
 a view is created by the first user, this view comprising an encrypted object, the first user being licensed for the encrypted object,
 this view is stored in a file by the first user, the encrypted object being encrypted, the result of this encryption being stored as encrypted data in the file, wherein
 non-encrypted data defining the encrypted object is stored in the file in parallel with the encrypted data relating to the encrypted object,
 this non-encrypted data can be read by the second user, so that the second user can see the encrypted object if he has acquired a license for this object, or a basic representation of the encrypted object if he has not acquired a license for this object; and
 in which the second user being also licensed for the said encrypted object:
 the first user deciphers a generic key with a first key associated to the encrypted object for which he is licensed,
 the first user encrypts the encrypted object with the generic key, the result of this encryption being stored as the encrypted data in the file,
 the second user receives the file and after having identified the encrypted object thanks to the non-encrypted data,
 the second user deciphers the generic key with a second key associated to the encrypted object for which he is licensed, and
 the second user deciphers the encrypting data with the generic key and visualizes the encrypted object modified or not by the first user,
 the first and the second keys being different, these keys being specific to at least one of the following: the software license or the encrypted object.

2. Method according to claim 1, in which:
 the non-encrypted data stored in the file represents basic parameters of the encrypted object.

3. Method according to claim 2, in which: the basic parameters being at least one of the following: a size of the encrypted object or a global location of the encrypted object in the view.

4. Method according to claim 1, in which:
 if the second user modifies the view created by the first user and stores the modified view in the file,
 the encrypted data that could not be read by the second user is not modified and is stored in the file just like it was when the second user read the file, so that the first user will be able to see the whole view including the modifications made by the second user and the encrypted object for which he is licensed.

5. Method according to claim 1, in which:
 in order to identify the encrypted object, the non-encrypted data is an identifier defining the encrypted object in a unique way, so that the second user can identify the encrypted object to decipher among all the other encrypted objects he may have.

6. Method according to claim 5, in which:
 a table containing the identifiers of the encrypted objects owned by the second user and the locations of these encrypted objects in the memory of his computer is created,
 this table associates these identifiers to these locations, so that when the second user receives the identifier of the encrypted object used in the view he can quickly locate this encrypted object in the memory of his computer.

7. Method according to claim 6, in which:
 the table is updated each time the second user acquires or uses a new encrypted object and stores it in the memory of his computer.

8. Method for exchanging a 3D view between a first and a second user having both a copy of a software product for creating 3D views, the copies of the software having different license numbers, in which:
- a view is created by the first user, this view comprising an encrypted object, the first user being licensed for the encrypted object,
- this view is stored in a file by the first user, the encrypted object being encrypted, the result of this encryption being stored as encrypted data in the file, wherein
- non-encrypted data defining the encrypted object is stored in the file in parallel with the encrypted data relating to the encrypted object,
- this non-encrypted data can be read by the second user, so that the second user can see the encrypted object if he has acquired a license for this object, or a basic representation of the encrypted object if he has not acquired a license for this object; and
- in which the second user being also licensed for the said encrypted object:
- the first user sends to the second user the non-encrypted data which is a unique identifier identifying the encrypted object,
- the second user receives the identifier, and identifies the encrypted object corresponding to this identifier,
- the second user deciphers the encrypted object corresponding to this identifier, this encrypted object being stored in the memory of his computer,
- the second user replaces the encrypted object of the view by the encrypted object located in the memory that has been deciphered.

9. Method according to claim 8, in which:
- the encrypted data relating to the encrypted object is excluded from the file.

10. A method according to claim 8, in which:
- a table containing the identifiers of the encrypted objects owned by the second user and the locations of these encrypted objects in the memory of his computer is created,
- this table associates these identifiers to these locations, so that when the second user receives the identifier of the encrypted object used in the view he can quickly locate this encrypted object in the memory of his computer.

* * * * *